United States Patent Office 3,312,189
Patented Apr. 4, 1967

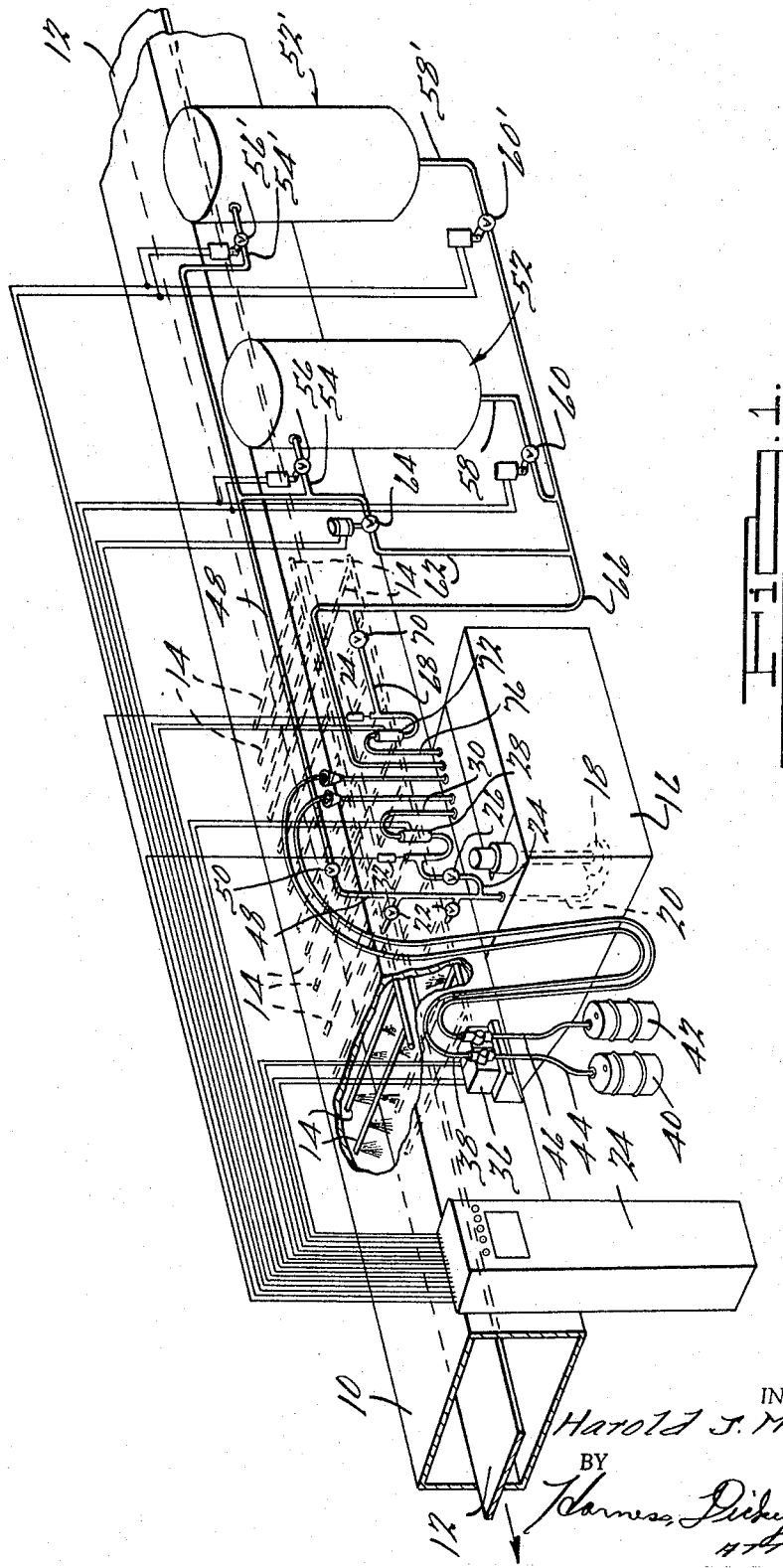

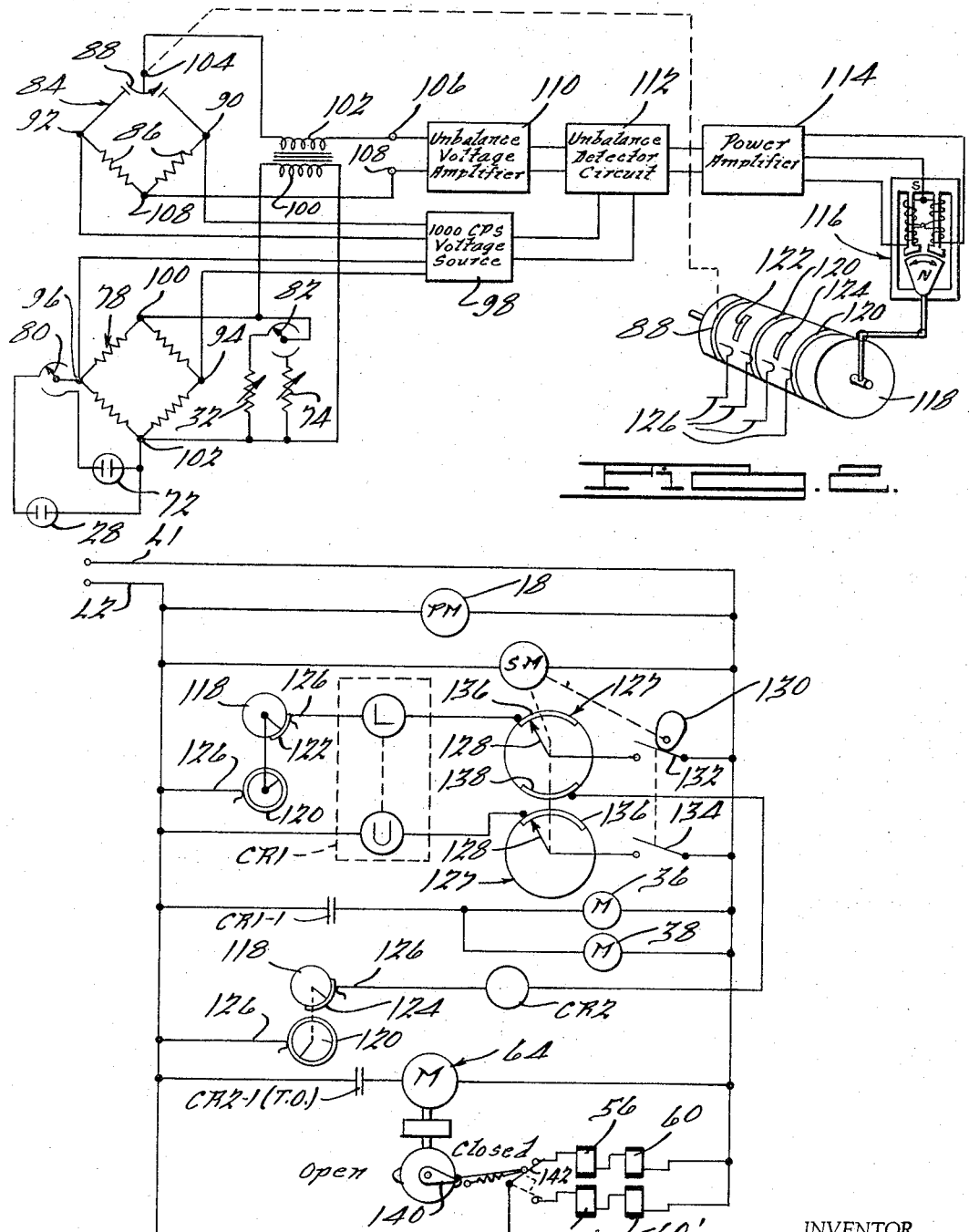

3,312,189
AUTOMATIC SOLUTION CONTROL SYSTEM
Harold J. McVey, Walled Lake, Mich., assignor to Hooker Chemical Corporation, Niagara Falls, N.Y., a corporation of New York
Filed Dec. 24, 1963, Ser. No. 333,161
8 Claims. (Cl. 118—7)

The present invention broadly relates to an improved processing apparatus for applying a coating on the surfaces of metals and more particularly to a solution control system which is operative to automatically replenish a solution maintaining its concentration within preselected limits and to concurrently pass the solution through an ion exchange bed so as to remove therefrom undesirable constituents. More specifically, the present invention relates to an improved apparatus and process which provides for automatic and continuous treatment of metal surfaces for forming chemical conversion coatings with liquid treating solutions the composition and concentration of which are automatically maintained producing thereby surface coatings of consistent quality and uniformity.

The present invention is related to and constitutes a further improvement over the process as disclosed in United States Patent No. 2,967,791, issued Jan. 10, 1961, for "Process of Coating Aluminum," and United States Patent No. 3,032,447, issued May 1, 1962, for "Process for Continuously Operating Chromating Solutions," which are owned by the assignee of the present invention. The process as disclosed in the aforementioned patents includes inter alia the use of an ion exchange resin bed through which a portion of an aqueous acidic treating solution containing hexavalent chromium and fluoride ions is passed so as to remove therefrom undesirable aluminum fluoride complexes which have a tendency to form sludge and additionally reduce the activity of the treating solution. It was found that by thus processing the treating solution so as to maintain the aluminum fluoride complex below a preselected magnitude, the prior practice of continuously and carefully analyzing the solution composition and adding excess makeup fluoride and other replenishing concentrates thereto could be substantially alleviated providing thereby a substantially superior process.

It has now been discovered that while improvements are obtained in accordance with the process as taught in the aforementioned United States patents, problems nevertheless are encountered due to the substantial differences in the activity of the ion exchange resin during the course of its use resulting in substantial fluctuations in the total aluminum fluoride complex present with a corresponding fluctuation in the activity of the coating solution. For example, it has been found that when the ion exchange unit is first placed on stream, its efficiency is very high effecting a removal of substantially all of the aluminum or other contaminating ions in the solution resulting in a rapid increase in the activity of the solution and an increase in its acidity. This accordingly, effects the production of thicker coatings on the surfaces of the aluminum being treated. As the ion exchange resin progressively becomes depleted due to the accumulation of contaminating ions on the active surfaces thereof, the acidity of the solution slowly decreases and the concentration of contaminating ions progressively increases resulting in a progressive reduction in the activity of the coating solution with a corresponding reduction in the thickness of the coatings produced on the aluminum surfaces. It will be apparent from the foregoing that the wide fluctuations in solution activity result in a nonuniformity in the thickness of the coating formed which is objectionable not only from the standpoint of producing excessively heavy coatings which constitutes an uneconomical operation but also the production of excessively thin coatings which do not have the requisite corrosion resistance and paint bonding characteristics.

It is accordingly a principal object of the present invention to provide an improved control system for liquid treating solutions for forming chemical conversion type coatings on metal surfaces whereby automatic replenishment of active constituents and removal of undesirable constituents is achieved providing for a solution of substantially uniform activity resulting thereby in substantially uniform treatment of successive workpieces.

Another object of the present invention is to provide an improved liquid treating process in which the conductivity of the solution prior to use as well as the conductivity of the solution processed through the ion exchange bed serve as the bases for effecting replenishment of the solution and control of the proportion of liquid sent through the ion exchange bed.

Still another object of the present invention is to provide an improved treating process for controlling the concentration of an aluminum fluoride complex anion in an aqueous acid solution by controlling the proportion of solution passed through a cation exchange resin and concurrently controlling the concentration of other active constituents therein by automatically replenishing the solution maintaining thereby a substantially uniform activity of the treating solution.

A further object of the present invention is to provide an improved control system for automatically controlling the concentration of active and undesirable constituents in a chromating solution which is of versatile use, of automatic and simple operation, and of economical manufacture and simple control.

The foregoing and other objects and advantages of the present invention are achieved by providing a continuously recirculating treating solution including conductivity sensing means operative to sense the conductivity of the solution being applied to the surfaces of the workpieces being treated as well as the conductivity of the solution passing from the ion exchange resin bed whereupon replenishment of the active constituents in the solution and a control of the proportion of solution passed through the ion exchange bed consistent with the activity thereof and concentration of undesirable ion complexes is automatically controlled maintaining thereby uniformity in composition and activity of the treating solution.

Other objects, features, and advantages of the present invention will become apparent from the subsequent description, taken in conjunction with the accompanying drawings, wherein:

FIGURE 1 is a perspective view of a continuous spray installation for processing strip material which incorporates an automatic solution control system in accordance with the preferred embodiments of the present invention;

FIGURE 2 is a diagrammatic view of the circuitry for sensing the conductivity of the solution; and FIGURE 3 is a diagrammatic view of the control circuitry for controlling the addition of makeup concentrate to the solution and the proportion of solution passing through the ion exchange resin bed.

Referring now in detail to the drawings and as may be best seen in FIGURE 1, the process installation comprises a tunnel or chamber 10 through which a continuous strip 12 such as a sheet of aluminum or an alloy of aluminum consisting predominantly of aluminum is passed and is subjected to a spray treatment of the treating solution. The spray headers and nozzles are illustrated in phantom at 14 and are arranged above and below the strip 12 assuring intimate contact of the treating solution with both face surfaces of the strip. The solution after being sprayed against the strip 12 is drained from the tunnel 10 into the base of a solution tank 16 which is provided with an electrically driven submersible pump 18 for pumping the solution under the desired pressure through a discharge line 20 which is connected by means of valves 22 to each of the spray headers 14.

The discharge line 20 is provided with a side branch indicated at 24 having a valve 26 therein through which a portion of the solution pumped toward the spray heads is diverted and passed through a continuous flow conductivity cell indicated at 28. In the arrangement as shown in FIGURE 1, the solution is passed upwardly through the cell 28 and on passing from the outlet end thereof is returned back to the tank 16 through a discharge line 30. The conductivity cell 28 is also provided with a temperature compensating unit indicated at 32 which is mounted in the side branch 24 before the inlet of the solution to the conductivity cell 28 so as to compensate for fluctuations in the conductivity of the solution caused by variations in the temperature of the treating solution. The conductivity cell 28 and the temperature compensating unit 32 are electrically connected to a central control unit 34 which in response to the conductivity of the solution is operative to energize one or more chemical proportioning feed pumps indicated at 36, 38 which are operative to pump makeup concentrate stored in drums 40, 42 respectively, through lines 44, 46 to the solution tank 16.

The discharge line 20 beyond the spray headers 14 is connected to a supply line 48 provided with a shutoff valve 50 through which a proportion of the pressurized spray solution is diverted through one of a plurality ion exchange units such as the units 52, 52' connected to each other in parallel. The ion exchange unit 52 is connected to the supply line 48 by means of an inlet line 54 having a motorized or otherwise remotely actuable shutoff valve 56. The solution is withdrawn from the ion exchange unit through an outlet line 58 having a similar automatic remotely actuable shutoff valve 60. The inlet valve 56 and outlet valve 60 are electrically connected to and controlled by the central control unit 34. A bypass line 62 extends between the inlet line 54 and outlet line 58 and is provided with a remotely variable flow control valve 64 such as a motorized valve for example, which is electrically connected to the central control unit and is operative to control the relative quantity of solution passing through the ion exchange unit.

The ion exchange unit 52' is connected in parallel to the ion exchange unit 52 by means of an inlet line 54' having an inlet shutoff valve 56' and an outlet line 58' provided with an outlet shutoff valve 60' such that one unit can be on stream while the other unit can be either regenerated or placed in a standby condition.

The combined effluent through the bypass line 62 and from the outlet lines of either of the ion exchange units 52, 52' are passed through a return line indicated at 66 back to the solution supply tank 16. A portion of the solution in the return line 66 is diverted through a branch conduit 68 having a shutoff valve 70 therein which in turn is connected to a conductivity cell 72 which is adapted to continuously read the conductivity of the solution diverted through the ion exchange units. The branch conduit 68 is also provided with a temperature compensating unit 74 so as to compensate for fluctuations in the conductivity in the solution resulting from fluctuations in the temperature thereof. The solution passing through the conductivity cell 72 is continuously discharged into the solution tank 16 through a conductivity cell return pipe 76.

It will be apparent from the foregoing description that in accordance with the process and apparatus as illustrated in FIGURE 1, treating solution is continuously pumped through the conductivity cells 28 and 72 while being continuously discharged from the spray headers 14 during which time a selected portion of the solution is diverted through one of the ion exchange units 52, 52' while periodic replenishments to the solution are made from the concentrate drums 40, 42. This specific arrangement is particularly applicable for the continuous application of chromating solutions on metals such as zinc, aluminum, magnesium, cadmium, copper, iron, brass, bronze and the like. The principal ingredient of such solutions comprises hexavalent chromium. These solutions further include suitable ions to modify the rate of coating formation as well as the properties of the resultant coating formed. Coating activators and modifiers conventionally comprise ions such as the fluoride ion, complex fluoride ions, chloride ions, sulfate ions, nitrate ions, formate ions, ferrocyanide ions, etc. The solutions further contain an acid constituent which is operative to maintain the pH thereof within the desired range. Conventionally, the pH of the processing solutions are sufficiently acid such that attack of the surface of the metal occurs producing metal ions which form complexes with the activating ions in the solution. The formation of such ion complexes between the metal dissolved from the sheet being processed and the activator ions in the solution have a tendency to form sludge in addition to removing the accelerator from the solution effecting a reduction in the activity thereof. Passing a small proportion of the solution continuously through a strongly acidic cation exchange resin is effective to remove the undesirable cations from the solution and effect a disassociation of the complex anions formed such that the effluent from the ion exchange bed is devoid of such complexes and additionally includes the liberated activating anions obtained from the disassociation of the complex. Conventionally, it has been found that by proportioning the sizes of conduits connected to the spray headers and to the ion exchange unit or by incorporating a suitable flow-control valve so as to divert from about 1% up to about 10% of the total solution to the ion exchange units and to the bypass conduit 62 connected in parallel thereto, adequate control of the proportion of undesirable complexes can be achieved for solutions of the aforementioned type.

The automatic control of the proportion of liquid bypassing the ion exchange unit on stream and the periodic replenishment of the constituents in the makeup solution drums 40, 42 will now be described with particular reference to FIGURES 2 and 3. In a typical processing of aluminum sheet, the drum 40 may contain for example, chromic acid and hydrofluoric acid while the drum 42 may contain a makeup concentrate of ferrocyanide which are pumped to the solution tank 16 by the chemical proportioning pumps 36, 38 in a controlled proportion so as to maintain the solution within the desired concentration. As hereinbefore described, the conductivity of the solution passing to the spray headers and passing to the operative ion exchange unit on stream is determined by the conductivity cell 28 positioned in the side branch line 24. The conductivity on the other hand of the solution passing from the ion exchange unit and from the bypass line 62 is measured by the conductivity cell 72 positioned in branch conduit 68. These conductivity cells which are well known in the art comprise a pair of spaced electrodes between which a voltage is applied and the conductance thereof is measured in reciprocal ohms or mhos. The cells are calibrated in accordance with their "cell constant" which is a function of the area of the electrodes and the distance separating the electrodes.

As best seen in FIGURE 2, each conductivity cell 28, 72, is disposed in parallel to a fixed resistor of a lower bridge indicated at 78 and are selectively electrically connected by means of a rotary switch 80. Similarly, the thermal compensating devices 32, 74 are connected in parallel to each other and comprise variable resistances which are selectively electrically connected through a rotary switch 82 having its wiper contact oriented so as to connect the appropriate temperature compensating unit consistent with the conductivity cell that is in the circuit.

An upper bridge 84 consists of two fixed resistors 86 having a split-stator variable capacitor indicated at 88. Terminals 90 and 92 of the upper bridge 84 and terminals 94 and 96 of the lower bridge 78 are connected in parallel to a low voltage 1000 cycles per second alternating current supply unit indicated at 98. The output voltage from the terminals 100, 102 of the lower bridge 78 which is a function of the conductivity of the solution is applied to the input transformer primary winding indicated at 100 which in turn induces a voltage in the transformer secondary winding 102. The voltage induced in the secondary winding 102 is applied across terminals 104, 106 which is in series with the output voltage across the terminals 104, 108 of the upper bridge 84. The output voltage of the upper bridge is varied by changing the position of the rotor of the variable balancing capacitor 88 and is adjusted so that the output voltage of the upper bridge across the terminals 104, 108 is equal and opposite in phase to the voltage induced in the input transformer secondary windings 102 and applied across the terminals 104, 106. When this occurs the voltage between terminals 106, 108 is reduced to zero and an equilibrium condition is reached. When this equilibrium condition exists the relative angular disposition of the split-stator variable capacitor indicates the conductivity of the solution under measurement.

Terminals 106 and 108 are electrically connected to an unbalanced voltage amplifier indicated at 110 and any differential voltage between these two terminals is first amplified and then compared in phase to a reference voltage to determine the direction of unbalance, as provided by an unbalance detector indicated at 112. A pair of direct current voltages are obtained from the unbalance detector unit 112 which are of opposite polarity and differ in voltage in a magnitude determined by an amount proportional to the unbalance of the bridge. The unbalance detector unit 112 is in turn electrically connected to a push-pull power amplifier which is indicated at 114 and which in turn is connected to a selsyn type motor 116 which is mechanically coupled to a rotor 118 having the split-stator variable balancing capacitor 88 thereon whereupon the rotor is moved to a position which unbalances the upper bridge 84 sufficiently so as to provide an output which cancels the signal from the lower bridge. This results in a condition where both bridges are unbalanced by the same amount resulting in an equilibrium condition which occurs almost instantaneously.

In addition to the variable balancing capacitor 88 on the rotor 118, the rotor also incorporates a pair of contact bands indicated at 120 in FIGURE 2 and two arcuate contacts 122, 124 which are adapted to be electrically contacted by contact brushes 126. The arcuate contact 122 is electrically associated with the conductivity cell 28 and the arcuate contact 124 is electrically associated with the conductivity cell 72 and is operative to effect selective energization of the components of the process in accordance with the control circuit shown in FIGURE 3.

It will be apparent from the foregoing that rotation of the rotor 118 to position the balancing capacitor 88 in an equilibrium condition wherein both bridges are unbalanced by the same amount in response to the conductivity of the solution as read by one of the two conductivity cells effects simultaneous positioning of the arcuate contacts 122, 124 on the rotor 118 relative to the contact brushes 126. As shown in FIGURE 3, the arcuate contact 122 is electrically connected to the contact band 120 which in turn is electrically connected by a wiper contact 126 to the conductor L2. When the rotor 118 is rotated to an equilibrium position such that either of the arcuate contacts 122, 124 are disposed in electrical contact with the wiper contact 126 adjacent thereto a circuit is completed through a rotary selector switch 127 effecting energization of either of the chemical proportioning pumps 36, 38 or of the motorized valve 64 as the case may be. The wiper contact 128 of the rotary selector switch 127 is drivingly coupled to a synchronous motor SM as indicated by the dotted lines which similarly is employed to effect rotation of the rotary switch 80 for selecting either of the two cells (FIG. 2) and the rotary switch 82 for selecting the appropriate one of the two temperature responsive compensating devices 32, 74 (FIG. 2) providing a fixed correlation between a cell, its temperature responsive compensating device, and the electrical components actuated thereby. The synchronous motor SM is also employed for rotating an eccentric 130 (FIG. 3) which is operative to close switch contacts 132 and 134 which are mechanically connected to each other as indicated by the dotted line. The switch contacts 132, 134 are oriented so that the switch 132 closes before the switch 134 and opens after the switch 134 has opened in response to the relative angular position of the eccentric 130.

The speed of rotation of the synchronous motor or the gear ratio employed will establish the frequency at which the conductivity of the solution is sensed at the frequency at which the appropriate corrective action is applied. In accordance with the practice of the present invention, an interval of about every 30 seconds has been found to provide close control of the solution concentrations maintaining it within preselected limits.

In operation, electrical energy is supplied to the control circuit through conductors L1 and L2 (FIG. 3) and to the 1000 cycles per second volted source 98 (FIG. 2) whereupon the submersible pump motor 18 is energized commencing to pump pressurized treating solution from the supply tank 16 to the spray heads and accompanying piping. The synchronous motor SM simultaneously is energized effecting rotation of the rotary switches 80, 82 (FIG. 2) and 127 (FIG. 3) and the eccentric 130. With their respective wiper contacts in positions as shown in FIGURES 2 and 3, the conductivity cell 28 is electrically connected in parallel to the terminals 96, 102 and the control circuit as shown in FIGURE 2 is operative to rotate the rotor 118 to a position of equilibrium wherein the balancing capacitor 88 is rotated to a position consistent with the conductivity of the solution passing to the spray heads and to the ion exchange unit. Assuming that the conductivity of the solution is above a preselected minimum, the wiper contact 126 is angularly spaced from the arcuate contact 122 and upon the closing of the switch 132 the coil designated as L of latching relay CR1 is not energized through the wiper contact 126, contact band 120, arcuate contact 122, wiper contact 126, coil L of latch relay CR1, contact 136 of rotary switch 127, wiper contact 128 and switch 132. If on the other hand the conductivity of the solution is below a preselected minimum, such contact is made through the aforementioned elements effecting energization of the latch relay coil L effecting the closing of contact CR1–1 which in turn energizes the chemical proportioning pump motors 36, 38, causing them to commence pumping makeup concentrate from the drums 40, 42 into the supply tank 16. As the eccentric 130 continues to rotate, switch 134 is first opened deenergizing the unlatching coil U of latching relay CR1 and thereafter switch 132 opens deenergizing the latching coil L of the latch relay CR1. The latching relay remains in the latched position wherein its contact CR1–1 remains closed and pumps 36, 38 remain energized.

Thereafter each of the rotary switches are rotated to a position wherein the conductivity cell 72 is electrically connected to the circuit and the rotor 118 (FIG. 2) is again rotated to an equilibrium position to effect correction of the position of the bypass valve 64 in a manner subsequently to be described. When the rotary switches are again positioned so as to electrically connect the conductivity cell 28 to the control circuit the rotor 118 is again oriented in the appropriate equilibrium position and a sensing of the conductivity of the solution as indicated by the disposition of the arcuate contact 122 relative to the wiper contact 126 again occurs. Assuming that during the interim period insufficient makeup solution has been added to the treating solution in the supply tank 16, electrical contact is again established effecting a reenergization of the latching coil L followed by an energization of the unlatching coil U of latching relay CR1 in response to the closing of switch contacts 132, 134. As the eccentric continues to rotate, the switch contact 134 opens deenergizing the unlatching coil U followed thereafter by an opening of switch contact 132 whereupon the latching coil L is deenergized. The latch relay CR1 remains latched under these conditions wherein its contact CR1–1 remains closed continuing operation of the chemical proportioning pump motors 36, 38.

When the conductivity of the solution has been increased by the addition of make-up solution beyond a preselected magnitude as determined by the angular positioning of the arcuate contact 122 on the rotor 118, the rotor 118 is rotated to a position for providing an equilibrium condition between the upper and lower bridges such that the arcuate contact 122 moves out of electrical contact with the wiper contact 126. On subsequent rotation of the several rotary switches to a position wherein the conductivity cell 28 is again electrically connected to the control circuits corresponding to the position as shown in FIGURES 2 and 3, no electrical contact is made between the wiper contact 126 and the arcuate contact 122. Accordingly, the latching coil L is not energized when the switch 132 is closed but the unlatching coil U is energized in response to the closing of contact 134 through arcuate contact 136 of the rotary switch 127 effecting an unlatching of the latching relay CR1 and an opening of its contact CR1–1. Accordingly, the electrical motors of proportioning pumps 36, 38 are deenergized stopping the flow of makeup solution to the treating supply tank.

In a similar manner, the conductivity cell 72 measuring the conductivity of the effluent from the ion exchange unit and the bypass line is electrically connected to the circuit in response to the rotation of the several rotary switches. The conductivity of the effluent from the ion exchange unit admixed with the bypassed solution is indicated by the relative angular disposition of the arcuate contact 124 on the rotor 118 relative to the wiper contact 126 adjacent thereto. In the angular position as shown in FIGURE 3, the arcuate contact 124 is rotated to a position out of electric contact with the wiper contact 126 such that upon the closing of switch contact 132 no current passes from the wiper contact 128 to the arcuate contact 138 of the rotary switch 127 preventing energization of control relay CR2. Switch contact 134 is not electrically associated with control relay CR2 or other circuitry involving the conductivity cell 72. When, however, the conductivity of the combined effluent from the bypass line and from the ion exchange unit on stream drops below a preselected magnitude as determined by the arcuate disposition of the arcuate contact 124 on the rotor 118 then electrical contact is made through the wiper contact 126, contact band 120, arcuate contact 124, wiper contact 126, arcuate contact 138, wiper contact 128 and switch contact 132 effecting an energization of control relay CR2 which closes its time delay open contact CR2–1 effecting energization of the motor of the motorized bypass valve 64 effecting an incremental closing thereof forcing a greater proportion of the solution through the ion exchange unit and a corresponding smaller amount through the bypass line 62 (FIG. 1). The duration by which the motorized bypass valve 64 remains energized is controlled by the amount of time delay incorporated in the relay CR2. Conventionally, a period of several seconds is adequate to provide for a preselected reduction in the quantity of solution bypassing the ion exchange unit. On the next cycle of rotation of the rotary switches, the conductivity of the effluent is again determined and if insufficient correction has been applied as indicated by the continued electrical contact between the arcuate contact 124 and wiper brush 126, the motorized bypass valve is again energized for a preselected time interval effecting still further closure of the bypass valve.

The aforementioned controlled operation of the bypass valve continues until it attains the fully closed position wherein all of the solution pumped to the ion exchange units pass therethrough with none of the solution passing through the bypass line 62. The closing of the motorized bypass valve indicates that the ion exchange resin has become substantially saturated and reactivation thereof is necessitated. Accordingly, at that time or at a preselected time delay period thereafter, a cam 140 mechanically coupled to and positionable in relationship to the valve stem of the bypass valve is operative to mechanically actuate a selector switch 142 which moves from a position as shown in FIGURE 3 to a position as shown in phantom effecting deenergization of solenoid valves 56, 60 and a closing thereof and a corresponding energization of solenoid valves 56′, 60′ effecting an opening thereof whereupon ion exchange unit 52 is taken offstream and ion exchange unit 52′ is placed on stream. The depleted ion exchange unit taken off stream can thereafter be regenerated and placed in a standby condition pending the depletion of the other ion exchange unit in a manner as hereinabove described.

It will be apparent from the foregoing that automatic controlled operation of the active constituents in the treating solution as well as the controlled removal of undesirable constituents such as anion complexes can be automatically controlled so as to maintain the solution within the desired composition providing uniformity in the treatment of successive workpieces. Since the addition of makeup solution from the drums 40, 42 effects an increase in the conductivity of the solution and the removal and disassociation of anion complexes by the ion exchange unit similarly produces an increase in the conductivity of the solution, satisfactory combined control of these two systems is achieved by establishing a fixed relative disposition of the arcuate contacts 122, 124 on the rotor 118 such that the preselected minimum conductivity of the treating solution as read by conductivity cell 28 is a preselected value lower than the minimum conductivity of the effluent from the ion exchange unit as indicated by the conductivity cell 72. Typically, for a chromic acid, hydrogen fluoride activated treating solution for use in treating aluminum, a conductivity of about 25,000 mmhos for the treating solution and a minimum conductivity of about 25,500 to 26,000 mmhos for the effluent has provided satisfactory control to assure the maintenance of appropriate solution composition. By this arrangement the increase in solution conductivity provided by the addition of makeup to the solution is insufficient to effect sufficient increase in conductivity achieved by the removal and disassociation of the undesirable metal complex whereby each of the two systems cooperate to maintain proper solution composition.

The ion exchange resins which have been found suitable, in accordance with the practice of the present invention, are designated as strongly acidic cation exchange resins such as, for example, styrene-divinylbenzene resins which have been sulfonated with sulfuric acid. Resins of this type are commercially available from a variety of sources and one such resin which has been found particularly satisfactory is designated as Dowex 50 and available from Dow Chemical Company. A substantially similar resin is available from Rohm & Haas Company under the designation IR–120 and from National Aluminate Company under the designation Nalcite HGR. The foregoing cation exchange resins are available in a sodium or hydrogen form and can be used in either form for the purposes of the present invention although the hydrogen form is generally preferred. It is also possible to admix the sodium and hydrogen forms of these resins so as to maintain the desired pH of the operating solution in the resin bed.

In the case of removing aluminum and trivalent chromium ions from the chromating solution, it is possible to employ cation exchange resins which contain as little as 1% of divinylbenzene and as high as 16% divinylbenzene as the cross-linking agent with styrene and the mesh size of the particles used is not particularly critical. For the most practical operation, however, it has been found that resins containing about 4% to 8% of divinylbenzene as the cross-linking agent with styrene and mesh sizes generally ranging between about 20 and 100, preferably between about 20 and 50 produce the most efficient degree of metallic ion separation and the fastest flow rates so that the use of resins of this type is preferred.

In order to further illustrate the automatic control system and the process comprising the present invention, the following example is provided. It will be understood that the specific composition of the solution as set forth in the example and the processing conditions specified are not intended to be limiting of the scope of the present invention as hereinbefore described and as more fully set forth in the subjoined claims.

*Example 1*

An operating chromating solution for applying a chromate coating on a type 3105 aluminum alloy was employed in an installation of the type shown in FIGURE 1 and had a composition and concentration of active constituents as follows.

| Ingredient: | Percent by weight |
|---|---|
| Chromate ($CrO_3$) | .25–.3 |
| Potassium ferricyanide | 0.04–0.10 |
| Fluoride ion | 0.4–0.5 |
| Dissolved aluminum | .1–.2 |

The composition of the operating solution as set forth in the foregoing table is typical of a usable range of constituents to provide a suitable adherent protective coating on aluminum and aluminum alloy surfaces. The specific concentration of the constituents as set forth in the foregoing table, will vary depending on the particular coating weight and alloy composition being treated consistent with the intended end use of the article. The aluminum constituent in the solution comprises an impurity and is present in the form of a fluoride complex which is removed by the ion exchange resin effecting disassociation of the complex and a liberation of the fluoride in a manner as previously described. In addition to the removal of aluminum ions from the solution, the trivalent chromium ions resulting from a reduction of the hexavalent chromium present in the solution is also achieved such that its concentration conventionally is less then about 0.003% in the solution.

The chromating solution as set forth in the foregoing table is further characterized as having a free acid pointage of from about 8 to about 12 which is derived by triturating 10 milliliters of the solution with a 1/10 normal solution of sodium hydroxide to a bromocresol green end point. Solutions of this type are conventionally applied at temperatures ranging from about 90° F. to about 110° F.

With a solution corresponding to a composition and concentration as indicated by the lower range of percentages as set forth in the foregoing table, the conductivity cell 28 was set at a control conductivity of about 18,500 mmhos. The conductivity cell 72 disposed in the return line of the combined effluent from the bypass and ion exchange unit was set at a controlled conductivity of about 19,500 mmhos or approximately 1000 mmhos above that of the solution applied to the surfaces of the aluminum sheet treated. An increase of this magnitude in the conductivity of the returned solution corresponds to removing the aluminum and disassociating the complexes thereof so as to maintain its level in the total treating solution at below about 0.05%.

In accordance with the treatment of solution of aluminum employing the solution as hereinbefore described, chromate coatings were formed on the aluminum alloy sheet which were of substantially constant weight and quality over a prolonged production run. During operation, the aluminum content in the solution never exceeded a level of 0.1%. Automatic replenishment of the active constituents in the solution comprising a concentrate containing about 5% of chromic acid and 2.5% hydrofluoric acid and a second concentrate containing a concentration of about 20% of potassium ferricyanide resulted in the maintenance of the concentration of these constituents within 5% of their concentration as set forth in the table, or a variation of only 0.01% in the actual concentration of the hexavalent chromium, potassium ferricyanide and fluoride ion concentration in the solution.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:
1. An apparatus for forming a chromate coating on a metal surface comprising a treating station including means for applying an aqueous acidic operating solution containing hexavalent chromium ions and contaminating anion complexes on a metal surface, a cation exchange resin operative to disassociate the anion complex and remove the cation constituent thereof, means including flow control means for passing a controlled proportion of said solution through said cation exchange resin and returning the effluent from said cation exchange resin back to said operating solution, sensing means for sensing the electrical conductivity of said effluent, and control means including means for measuring the electrical conductivity as sensed by said sensing means and operative to actuate said flow control means to increase the proportion of said solution passing through said cation exchange resin in response to a decrease in the electrical conductivity of said effluent below a preselected level as a result of a progressive depletion in the activity of said cation exchange resin.

2. An apparatus for forming a chromate coating on a metal surface comprising a treating station including means for applying an aqueous acidic operating solution containing hexavalent chromium ions and contaminating anion complexes on a metal surface, a cation exchange resin operative to disassociate the anion complex and remove the cation constituent thereof, means including flow control means for passing a controlled proportion of said operating solution through said cation exchange resin and returning the effluent from said cation exchange resin back to said operating solution, first sensing means for sensing the electrical conductivity of said operating solution, second sensing means for sensing the electrical conductivity of said effluent, replenishing means for supplying a concentrate containing hexavalent chromium ions to said solution, and control means including means for measuring the electrical conductivity as sensed by said first and said second sensing means and operative to actuate said replenishing means in response to a decrease in the conductivity of said solution below a preselected level and for actuating said flow control means to progressively increase the proportion of said solution passing through said cation exchange resin in response to a decrease in the conductivity of said effluent below a preselected level as a result of the progressive depletion in the activity of said cation exchange resin.

3. An apparatus for forming a chromate coating on a metal surface comprising a treating station including means for applying an aqueous acidic operating solution containing hexavalent chromium ions and contaminating anion complexes on a metal surface, a cation exchange resin operative to disassociate the anion complex and remove the cation constituent thereof, means including flow control means for passing a controlled proportion of said operating solution through said cation exchange resin and returning the effluent from said cation exchange resin back to said operating solution, first sensing means for sensing the electrical conductivity of said operating solution, second sensing means for sensing the electrical conductivity of said effluent, replenishing means for supplying a concentrate containing hexavalent chromium ions to said solution, and control means including means for measuring the electrical conductivity as sensed by said first and said second sensing means in a repetitive preselected ordered sequence and operative to actuate said replenishing means in response to a decrease in the conductivity of said operating solution below a preselected level and for controlling said flow control means to provide a progressive increase in the proportion of said operating solution passing through said cation exchange resin in response to a decrease in the conductivity of said effluent below a preselected level above the conductivity of said operating solution as a result of a progressive depletion in the activity of said cation exchange resin.

4. An apparatus for forming a chromate coating on a metal surface comprising a treating station including means for applying an aqueous acidic operating solution containing hexavalent chromium ions and contaminating anion complexes on a metal surface, a plurality of cation exchange resin beds operative to disassociate the anion complex and remove the cation constituent thereof, means including flow control means for passing a controlled proportion of said operating solution through one of said plurality of cation exchange resin beds and returning the effluent from the one of said plurality of cation exchange resin beds back to said operating solution, selector means for selecting one of said plurality of cation exchange resin beds, sensing means for sensing the conductivity of said effluent, and control means including means for measuring the electrical conductivity as sensed by said sensing means and operative to control said flow control means to increase the proportion of said solution passing through one of said plurality of cation exchange resin beds in response to the decrease in the conductivity of said effluent below a preselected level as a result of the progressive depletion in the activity of said cation exchange resin, and means operative in response to said flow control means for actuating said selector means for disconnecting one said cation exchange resin bed when the activity of the resin therein has been substantially depleted and for connecting another one of said plurality of cation exchange resin beds to receive the proportion of operating solution.

5. An apparatus for forming a chromate coating on a metal surface comprising a treating station including means for applying an aqueous acidic operating solution containing hexavalent chromium ions and contaminating anion complexes to a metal surface, a cation exchange resin operative to disassociate the anion complex and to remove the cation constituent thereof, means for withdrawing a portion of said operating solution and passing it through said cation exchange resin, bypass means including flow control means for bypassing a portion of the withdrawn solution around said ion exchange resin, means for returning the effluent from said cation exchange resin and said bypass means back to said operating solution, sensing means for sensing the electrical conductivity of said effluent, and control means including means for measuring the electrical conductivity of said effluent as sensed by said sensing means and operative to actuate said flow control means in response to a decrease in the conductivity of said effluent below a preselected level and progressively reduce the quantity of solution passing through said bypass means and increase the quantity passing through said cation exchange resin as the result of the progressive depletion in the activity of said cation exchange resin.

6. An apparatus for forming a chromate coating on a metal surface comprising a treating station including means for applying an aqueous acidic operating solution containing hexavalent chromium ions and contaminating anion complexes to a metal surface, a cation exchange resin operative to disassociate the anion complex and remove the cation constituent thereof, means for withdrawing a portion of said operating solution for passage through said cation exchange resin including bypass means having flow control means for bypassing a controlled amount of the withdrawn said solution around said cation exchange resin, means for returning the combined effluent from said cation exchange resin and said bypass means to said operating solution, first sensing means for sensing the electrical conductivity of said operating solution, second sensing means for sensing the electrical conductivity of said effluent, replenishing means for supplying a concentrate containing hexavalent chromium ions to said operating solution, and control means including means for measuring the electrical conductivity as sensed by said first and said second sensing means and operative to actuate said replenishing means in response to a decrease in the conductivity of said operating solution below a preselected level and for actuating said flow control means in response to a decrease in the conductivity of said effluent below a preselected level to progressively reduce the quantity of solution passing through said bypass means and correspondingly increase the quantity passing through said cation exchange resin as a result of the progressive depletion in the activity of said cation exchange resin.

7. An apparatus for forming a chromate coating on a metal surface comprising a treating station including means for applying an aqueous acidic operating solution containing hexavalent chromium ions and contaminating anion complexes to a metal surface, a cation exchange resin operative to disassociate the anion complex and remove the cation constituent thereof, means for withdrawing a portion of said operating solution for passage through said cation exchange resin including bypass means having flow control means for bypassing a controlled amount of the withdrawn said solution around said cation exchange resin, means for returning the combined effluent from said cation exchange resin and said bypass means to said operating solution, first sensing means for sensing the conductivity of said operating solution, second sensing means for sensing the conductivity of said effluent, replenishing means for supplying a concentrate containing hexavalent chromium ions to said solution, and control means including means for measuring the electrical conductivity as sensed by said first and said second sensing means in a repetitive preselected ordered sequence and operative to actuate said replenishing means in response to a decrease in the conductivity of said solution below a preselected level and for controlling said flow control means in response to a decrease in the conductivity of said effluent below a second preselected level above that of said operating solution and progressively reduce the quantity of said solution passing through said bypass means and correspondingly increase the quantity passing through said cation exchange resin as the result of the progressive depletion in the activity of said cation exchange resin.

8. An apparatus for forming a chromate coating on a metal surface comprising a treating station including means for applying an aqueous acidic operating solution containing hexavalent chromium ions and contaminating anion complexes to a metal surface, a plurality of ion exchange units each containing a cation exchange resin operative to disassociate the anion complex and remove the cation constituent thereof, means for withdrawing a portion of said operating solution for passage through one of said ion exchange units, selector means for selectively connecting one of said units to receive the withdrawn said solution, bypass means including flow control means for bypassing a controlled amount of the withdrawn said solution around the one said ion exchange unit, means for returning the combined effluent from the one said ion exchange unit and said bypass means to said operating solution, sensing means for sensing the electrical conductivity of said effluent, and control means including means for measuring the electrical conductivity as sensed by said sensing means and operative to actuate said flow control means in response to a decrease in the conductivity of said effluent below a preselected level to progressively reduce the quantity of solution passing through said bypass means and correspondingly increase the quantity passing through the one said ion exchange unit as the result of the progressive depletion in the activity of the resin in the one said ion exchange unit, said control means further operative in response to the stoppage of the flow of solution through said bypass means for actuating said selector means effecting the disconnecting of the one said ion exchange unit and the connecting of another ion exchange unit of said plurality of ion exchange units.

References Cited by the Examiner

UNITED STATES PATENTS

| | | |
|---|---|---|
| 2,687,139 | 8/1954 | Noble et al. _____ 137—5 |
| 2,774,732 | 12/1956 | Blight _____ 137—5 X |
| 2,928,406 | 3/1960 | Cunniff et al. _____ 137—5 |
| 2,967,791 | 1/1961 | Halversen _____ 148—6.16 |
| 3,019,799 | 2/1962 | Douty _____ 134—57 |
| 3,095,121 | 6/1963 | Douty et al. |

CHARLES A. WILLMUTH, *Primary Examiner.*

J. P. McINTOSH, *Assistant Examiner.*